United States Patent [19]

Kawamura et al.

[11] 4,109,625
[45] Aug. 29, 1978

[54] EXHAUST GAS PURIFYING DEVICE FOR INTERNAL COMBUSTION ENGINE WITH AUXILIARY COMBUSTION CHAMBERS

[75] Inventors: Hideo Kawamura, Yamato; Kimi Kubota, Chigasaki, both of Japan

[73] Assignee: Isuzu Motors Limited, Tokyo, Japan

[21] Appl. No.: 763,749

[22] Filed: Jan. 28, 1977

[30] Foreign Application Priority Data

Jan. 31, 1976 [JP] Japan ............................. 51-10381[U]

[51] Int. Cl.² ............................................ F02D 25/06
[52] U.S. Cl. .............................................. 123/119 A
[58] Field of Search ............... 123/119 A, 75 B, 52 M

[56] References Cited
U.S. PATENT DOCUMENTS 3,703,164  11/1972  Weaving .......................... 123/119 A Primary Examiner—Wendell E. Burns Attorney, Agent, or Firm—Sughrue, Rothwell, Mion, Zinn and Macpeak

[57] ABSTRACT

A recirculating and recombustion type of exhaust gas purification system for a compression ignition engine includes an expansion manifold 11 communicating with the auxiliary combustion chambers 7 of each cylinder via circulating passages 12 controlled by cam operated valves 13. The relatively rich exhaust gas remaining near the fuel injector 8 in an auxiliary chamber 7 at the end of a power stroke is expanded into the manifold 11 via an open control valve 13, and is then drawn into the auxiliary chamber of another cylinder whose piston is near the bottom of its intake or suction stroke via another open control valve. The thus recirculated or transferred exhaust gas is cooled by its expansion into the manifold, as well as by water jacketing within the cylinder head and air surrounding the exposed periphery of the manifold.

3 Claims, 3 Drawing Figures

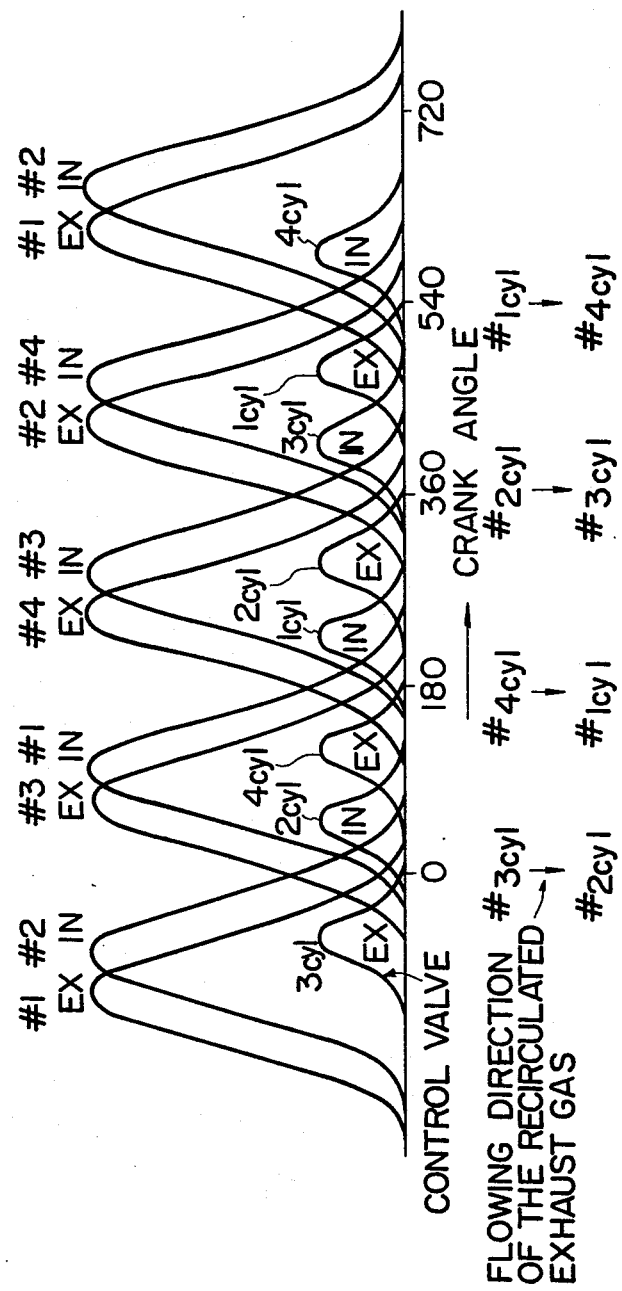

EXHAUST GAS PURIFYING DEVICE FOR INTERNAL COMBUSTION ENGINE WITH AUXILIARY COMBUSTION CHAMBERS

BACKGROUND OF THE INVENTION

This invention relates to an exhaust gas purifying device for a compression ignition type of internal combustion engine provided with auxiliary combustion chambers.

Most conventional exhaust gas purifying devices wherein the exhaust gas is circulated in a compression ignition type of internal combustion engine employ a method in which part of the gas expelled from the exhaust passage is circulated into the gas suction or intake passage, or employ an internal re-circulation method utilizing the overlap timing of the suction and exhaust valves. Such conventional methods adversely affect the power output and smoke generation characteristics of the engine, however, and are especially ineffective in the high load ranges of engine operation where the excess air ratio is relatively low.

SUMMARY OF THE INVENTION

In view of the drawbacks accompanying the conventional methods, an object of this invention is to effectively carry out exhaust gas circulation during the high load operation of an engine without adversely affecting its power output, smoke generation, etc. A specific feature of the invention resides in the exhaust gas from the auxiliary combustion chamber of one cylinder, in which the piston nears the end of its expansion or power stroke, being circulated through a cooling manifold to the auxiliary combustion chamber of another cylinder, in which the piston nears the end of its suction or intake stroke.

Briefly, and in accordance with the present invention, a recirculating and recombustion type of exhaust gas purification system for a compression ignition engine includes an expansion manifold communicating with the auxiliary combustion chambers of each cylinder via circulating passages controlled by cam operated valves. The reatively rich exhaust gas remaining near the fuel injector in an auxiliary chamber at the end of a power stroke is expanded into the manifold via an open control valve, and is then drawn into the auxiliary chamber of another cylinder whose piston is near the botton of its intake or suction stroke via another open control valve. The thus recirculated or transferred exhaust gas is cooled by its expansion into the manifold, as well as by water jacketing within the cylinder head and air surrounding the exposed periphery of the manifold.

BRIEF DESCRIPTION OF THE DRAWINGS

In the drawings
FIG. 3 shows a graphical representation of the opening and closing timing of control valves and suction-exhaust valves.

DETAILED DESCRIPTION OF THE PREFERRED EMBODIMENT

Figure 1:
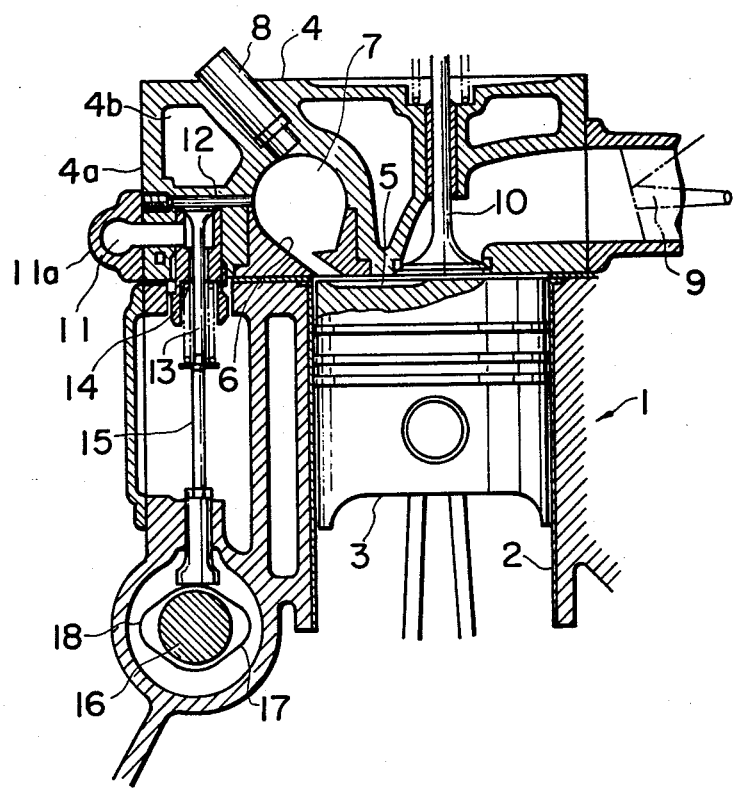
FIG. 1 shows a vertical sectional view of an engine cylinder illustrating one embodiment of the invention.
Figure 2:
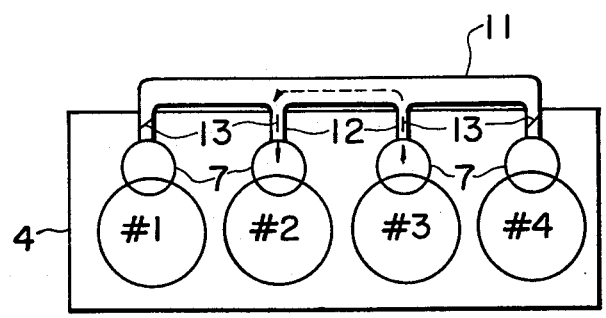
FIG. 2 shows a schematic diagram for explaining the operation of the embodiment shown in FIG. 1.

As shown in FIGS. 1 and 2, reference numeral 1 designates a cylinder body of a compression ignition type of internal combustion engine having a group of cylinders #1 through #4. A piston 3 is slidably inserted into each cylinder 2. Reference numeral 4 designates a cylinder head provided with an auxiliary combustion chamber 7 communicating through a port 6 with a main combustion chamber 5. An injection nozzle 8 for injecting fuel from a supply source (not shown) into the auxiliary combustion chamber 7 is provided in the cylinder head 4. Reference numeral 9 designates an exhaust gas passage, and 10 is an exhaust valve provided at the opening thereof. The exhaust valve 10 and a suction or air intake valve (not shown) are operated by a cam shaft 16 through a rocker arm mechanism or the like (not shown).

An exhaust gas expansion manifold 11 is arranged on the outer side wall 4a of the cylinder head 4, and communicates through an exhaust gas circulating passage 12 with the auxiliary combustion chamber 7 of each of the cylinders #1 through #4. A control valve 13 is provided in the middle of each exhaust gas circulating passage 12. The valve 13 is normally biased to a closed position by a return spring 14; however, it is opened by the upward movement of a rod mechanism 15. The cam shaft 16 cooperates with a crank shaft (not shown) of the engine. The cam shaft 16 is provided with a plurality of cams adapted to operate the suction valves and the exhaust valves. The cam shaft 16 is further provided with cam lobes 17 and 18 which, when in each of the cylinders #1 through #4 the expansion stroke nears its end, that is, immediately before the piston 3 reaches bottom dead center on the expansion stroke, and when the suction stroke is near its end, that is, immediately before or after the piston 3 has reached bottom dead center on the suction stroke, raise the rod mechanism(s) 15. The exhaust gas expansion manifold 11 can also be connected to the exhaust gas passage 9 through a bypass provided with a pressure control valve, to thereby vent or relieve any excessive pressure of the manifold 11.

In operation, when the piston of cylinder #3, for example, nears the end of its expansion or power stroke, its associated control valve 13 is raised against the force of the spring 14 through the rod mechanism 15 by a cam lobe 18 immediately before the piston 3 reaches bottom dead center, as a result of which the exhaust gas circulating passage 12 is opened. Thus, a portion of the hot, pressurized exhaust gas which remains in the auxiliary combustion chamber 7 expands into the manifold 11. On the other hand, when the piston of cylinder #2, for example, nears the end of its suction or intake stroke, its associated control valve 13 is opened by a cam lobe 17 and the rod mechanism 15 immediately before or after the piston has reached bottom dead center. As a result, the exhaust gas in the manifold 11 enters the auxiliary combustion chamber 7 of cylinder #2 through the opened circulating passage 12.

The exhaust gas thus transferred or circulated is suitably cooled by its expansion into the manifold 11 and by the cooling action of both water and air, and flows into an opened auxiliary combustion chamber due to the suction created by the piston. Accordingly, the exhaust gas is effectively cooled, and the gas circulation is smoothly carried out.

In the embodiment dislcosed, if the engine ignition order is #1, #3, #4 and #2, the exhaust gas circulation is repeatedly carried out in the following order, as shown in the timing diagram of FIG. 3:
Exhaust gas from #1 cylinder to #4 cylinder,
Exhaust gas from #3 cylinder to #2 cylinder,
Exhaust gas from #4 cylinder to #1 cylinder, and Exhaust gas from #2 cylinder to #3 cylinder.

Thus, the device according to this invention is so designed that exhaust gas circulation is effected from the auxiliary combustion chamber of one cylinder to the auxiliary combustion chamber of another cylinder. Therefore, as compared with a conventional exhaust gas circulation system, an internal combustion engine employing the device of the invention achieves improved volumetric efficiency in each cylinder. Accordingly, the herein disclosed exhaust gas purifying device does not seriously or adversely influence the power output, smoke generation, etc. of the engine, especially under high load operation.

When the control valve 13 closes, the exhaust gas is sealed in the auxiliary combustion chamber 7 by the upward movement of the piston 3. Therefore, an improved exhaust gas circulation effect is obtained, and the exhaust gas circulation rate with respect to the volume of the auxiliary combustion chamber 7 can be made extremely high. The exhaust gas expansion manifold 11 is arranged on the outer wall 4a of the head 4 adjacent a cooling water passage 4b in the head, and a large peripheral portion 11a of the manifold is exposed to the air. The exhaust gas is thus effectively cooled, which increases the volume of the circulated gas and greatly reduces the production of nitrous oxides in the combusted fuel as compared to conventional exhaust gas purifying devices.

What is claimed is:

1. In an exhaust gas purifying apparatus for a compression ignition type of internal combustion engine including a plurality of cylinders, a cylinder head and a piston reciprocatingly disposed in each cylinder, each cylinder having a main combustion chamber within each cylinder and an auxiliary combustion chamber in said cylinder head communicating therewith through an open port, and an exhaust gas outlet in said head communicating with each main combustion chamber, the improvements characterized by:
    (a) an exhaust gas expansion manifold arranged on an outer wall of said cylinder head,
    (b) a plurality of exhaust gas passage means individually communicating each auxiliary combustion chamber with said manifold so that said auxiliary combustion chambers are in communication with each other,
    (c) a plurality of valves individually disposed in each passage means for opening or closing the communication between said auxiliary combustion chamber and said manifold, and
    (d) valve control means for selectively opening each valve when its associated piston is near the bottom of its power expansion stroke simultaneously with the opening of another valve when its associated piston is near the bottom of its intake suction stroke, whereby exhaust gas from one auxiliary combustion chamber is coolingly expanded into the manifold and then drawn into another auxiliary combustion chamber.

2. A purifying apparatus as defined in claim 1, further comprising water jacket cooling means adjacent the passage means for further cooling the exhaust gas as it flows through the passage means.

3. A purifying apparatus as defined in claim 1, wherein the valve control means comprises:
    (a) a cam shaft adapted to be driven by a crank shaft of the engine,
    (b) a plurality of cam lobes mounted on the cam shaft, and
    (c) an equal plurality of rod mechanisms individually and operatively disposed between the cam lobes and the valves, the angular disposition of said cam lobes being such that a rod mechanism opens each valve near the bottom of its power expansion stroke and its intake suction stroke.

* * * * *